(No Model.)

R. D. YOUNG.
TOILET STAND.

No. 265,208.  Patented Sept. 26, 1882.

WITNESSES:
Jos. N. Rosenbaum.
Otto Risch.

INVENTOR
Richard D. Young
BY Paul Goepel.
ATTORNEY

UNITED STATES PATENT OFFICE.

RICHARD D. YOUNG, OF NEW YORK, N. Y.

TOILET-STAND.

SPECIFICATION forming part of Letters Patent No. 265,208, dated September 26, 1882.

Application filed July 15, 1882. (No model.)

*To all whom it may concern:*

Be it known that I, RICHARD D. YOUNG, of the city, county, and State of New York, have invented certain new and useful Improvements in Toilet-Stands, of which the following is a specification.

This invention has reference to an improved fancy perfume-stand for use on mantel-pieces, étagères, &c., it forming a neat and useful device for supporting perfumery-bottles; and the invention consists of a miniature wheeled vehicle the body of which is made of an openwork frame that supports a recessed filling adapted to receive and support the bottle and pin-cushions at each side thereof.

Figure 1:
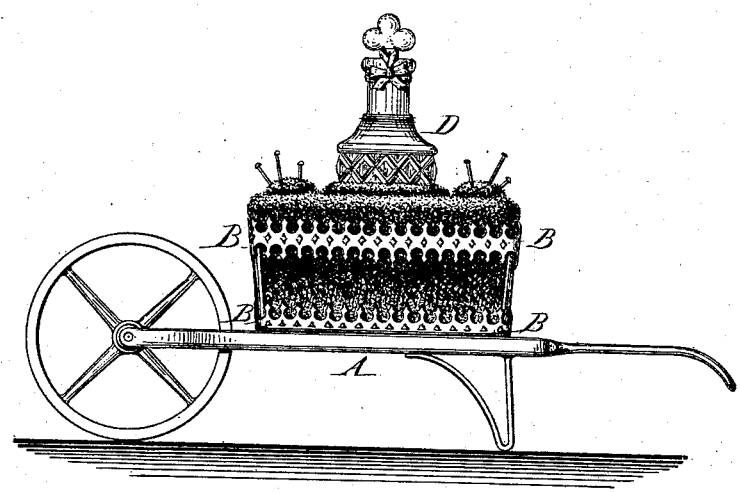
Figure 2:
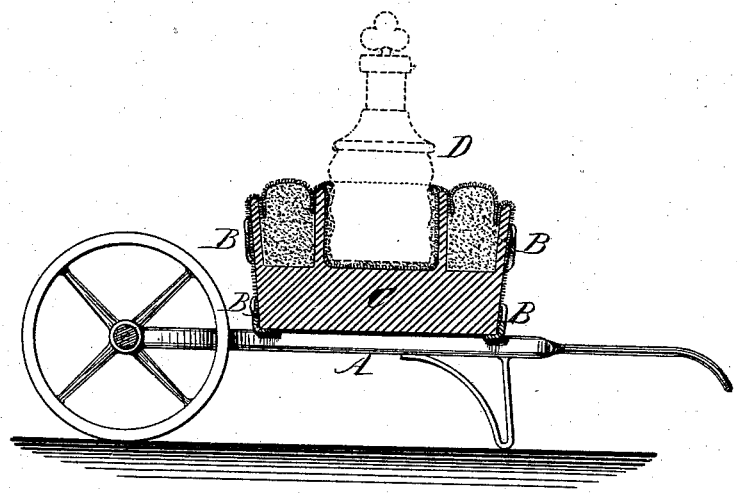

In the accompanying drawings, Figure 1 represents a side elevation of my improved perfume-stand, and Fig. 2 is a vertical longitudinal section of the same.

Similar letters of reference indicate corresponding parts.

A in the drawings represents a supporting-frame, which is made in the shape of a wheelbarrow or other wheeled vehicle. The body B of the vehicle is made of open-work and adapted to support the wooden filling-piece C, which is covered at the outside with velvet, plush, or other suitable ornamental fabric, and which is centrally recessed in such a manner as to form a socket for the support of a perfumery-bottle, D. The filling C is further recessed at each side of the perfume-bottle and the spaces filled with pin-cushions, as shown in the drawings. In this manner a very neat perfume-stand and pin-cushion combined is furnished, which forms an ornamental article for the mantel-piece and other uses.

Having thus described my invention, I claim as new and desire to secure by Letters Patent—

1. As a new article of manufacture, the perfume-stand herein described, which consists of a miniature wheeled vehicle the body of which is composed of an ornamental supporting-frame and of a filling-piece having a recess for the perfume-bottle, substantially as set forth.

2. As a new article of manufacture, the perfume-stand herein described, consisting of a miniature wheelbarrow the body of which is composed of an ornamental supporting-frame and of a filling-piece provided with a central recess for the perfume-bottle and side recesses for pin-cushions, said filling-piece being covered with velvet or other suitable material, as set forth.

In testimony that I claim the foregoing as my invention I have signed my name in presence of two subscribing witnesses.

RICHARD D. YOUNG.

Witnesses:
PAUL GOEPEL,
SIDNEY MANN.